UNITED STATES PATENT OFFICE.

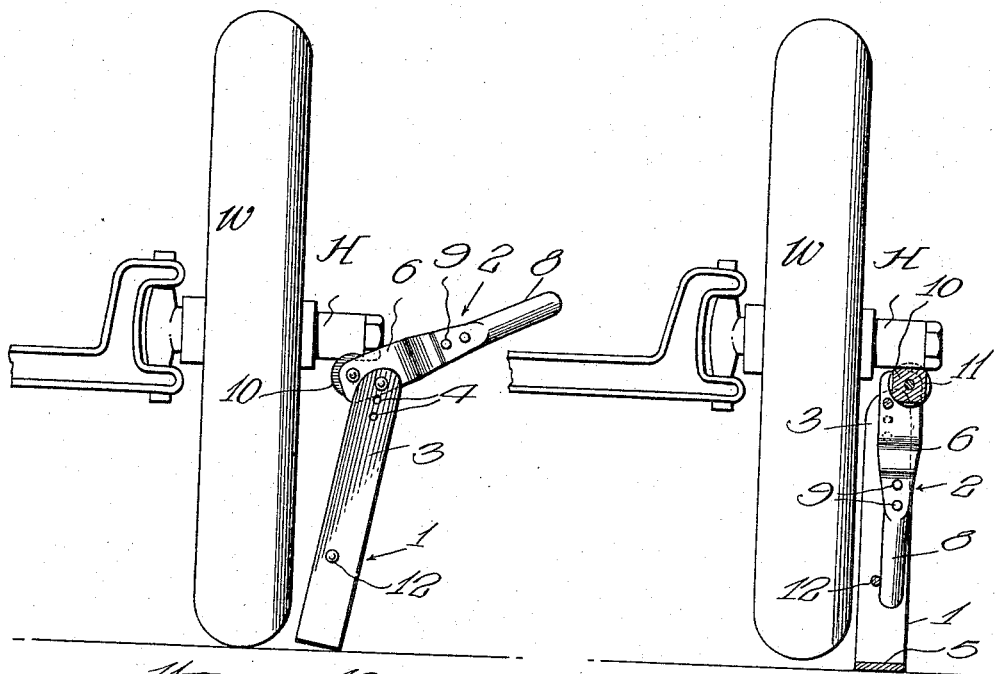
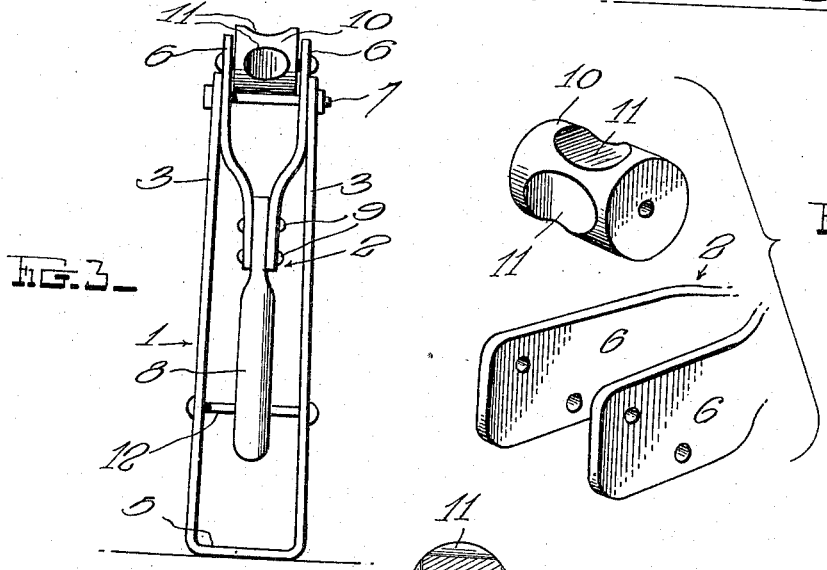
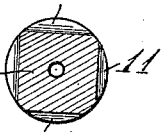

JOHN C. KISTLER, OF CLINTON, MISSOURI.

AUTOMOBILE-TIRE RELIEVER.

1,186,799. Specification of Letters Patent. Patented June 13, 1916.

Application filed December 13, 1915. Serial No. 66,545.

*To all whom it may concern:*

Be it known that I, JOHN C. KISTLER, a citizen of the United States, residing at Clinton, in the county of Henry and State of Missouri, have invented certain new and useful Improvements in Automobile-Tire Relievers; and I do declare the following to be a full, clear, and exact description of the invention, such as will enable others skilled in the art to which it appertains to make and use the same.

This invention relates to improvements in automobile tire relievers and has for its principal object to provide a simply constructed device having a rotatable bearing block upon which the axle hub rests when the device is in operation.

A further object of the invention is to provide a device having a rotatable bearing block in the periphery of which a number of seats are formed of various sizes in order to accommodate vehicles having hubs of different sizes.

A still further object of the invention is to provide a device which can be very inexpensively manufactured of very few parts, yet which will be very strong and efficient.

With the above and many other objects in view, the invention resides in the novel features of construction, and the combination and arrangement of parts which will hereinafter be more particularly described and claimed and shown in the drawings wherein:

Figure 1 represents an edge view of a vehicle wheel and the surrounding parts of the vehicle, my improved device being about to be applied to the hub for lifting the wheel from the ground; Fig. 2 is a similar view showing the wheel in raised position; Fig. 3 represents a front elevation of my improved device; Fig. 4 is a central vertical section of the rotatable bearing block; and Fig. 5 is a detail perspective view of said block and the forked end of the lever of the reliever.

In its preferred embodiment, my invention comprises a supporting standard 1 and a lever 2 fulcrumed thereto, said standard 1 being formed of a single strip of metal bent in the form of a U as shown in Fig. 3. The arms 3 of this U-shaped standard converge slightly toward their upper ends, said upper free ends being provided with a plurality of alined apertures 4 which are disposed in a vertical plane. The base 5 of the U-shaped member rests upon the ground and forms a support for the standard.

The lever 2 is preferably bifurcated and is adapted to be disposed between the arms 3 adjacent their upper ends, the arms 6 of said forked lever being provided with apertures for the reception of the fulcrumed bolt 7 which also extends through the apertures 4 and the arms 3. The openings or apertures in the arms 6 are positioned close to one edge thereof. The lever 2 with its forked end may be formed of one piece of metal or constructed as shown in the drawings where it is shown as formed of three parts. The handle 8 of the device is secured to the offset ends of the arms 6 by means of rivets or similar fastening elements 9.

The arms 6 of the forked end of the lever 2 rotatably receive therebetween a bearing block 10 substantially cylindrical in shape with a plurality of seats 11 formed in its periphery. These seats are shown as being of several sizes in order to accommodate vehicles having hubs of different diameters. It is obvious that by providing a tire reliever having a rotatable bearing block, the vehicle can be readily raised by the block without the parts of the vehicle becoming marred or scratched, inasmuch as the block readily moves into desired position.

In the operation of the device when the standard 1 is placed adjacent the wheel W of the vehicle with the hub H thereof resting in the apertured seats 11 in the bearing block 10, the standard 1 is tilted slightly to bring said block closer to the hub when the vehicle is in raised position. This disposition of the device when about to elevate the vehicle, is clearly shown in Fig. 1. When the lever 2 is lowered, to raise the wheel from the ground, the standard 1 is gradually moved to an upright position, thus maintaining the bearing block close to the inner end of the hub, said bearing block slowly rotating around its axis as the lever is moved downwardly. The lever is shoved down until the axis of the bearing block passes the fulcrum pin 7, when said block has passed the dead center, the handle of the lever resting against the brace bar 12 which acts as a stop therefor. This brace bar 12 connects the lower portions of the arms 3 to the standard. The lever is thus locked in position and the vehicle will be elevated until the device is either removed or the lever lifted upwardly to the position shown in Fig. 1 of the drawings.

From the foregoing description, it will be seen that I have invented an extremely simple device by which the tire of an automobile may be readily relieved from the weight of the body of the car, thereby greatly prolonging the life of the tire. It is obvious that this simply constructed tire reliever can be very readily operated merely by one downward stroke of the handle. The provision of variously sized seats on the improved bearing block will allow the device to be used with a great variety of motor vehicles, automobiles, and the like.

I claim as my invention:—

A tire reliever comprising an upright support, a lever fulcrumed thereto, and a rotatable bearing block having a plurality of various sized seats in its periphery.

In testimony whereof I have hereunto set my hand in presence of two subscribing witnesses.

JOHN C. KISTLER.

Witnesses:
W. B. KISTLER,
WILLIAM KLOTZ.

Copies of this patent may be obtained for five cents each, by addressing the "Commissioner of Patents, Washington, D. C."